Aug. 8, 1961 O. OEHLING 2,995,059
RANGE FINDER, PARTICULARLY FOR DETERMINING THE DEPTH
OF LIQUID COLUMNS AND THE LIKE
Filed May 5, 1959 2 Sheets-Sheet 2

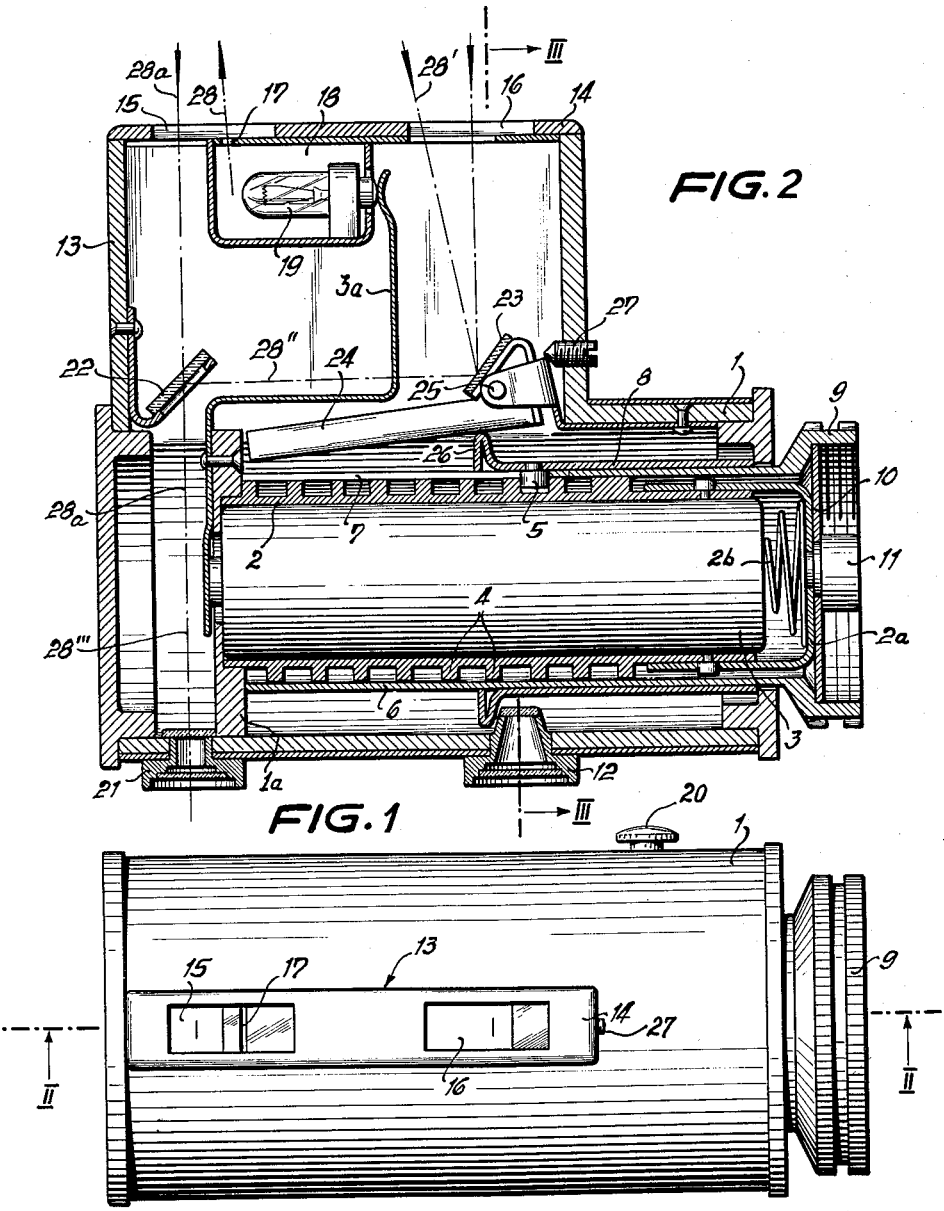

INVENTOR:
OTTO OEHLING

BY
*Kurt Kelman*
his Agent () # United States Patent Office 2,995,059
Patented Aug. 8, 1961

2,995,059
RANGE FINDER, PARTICULARLY FOR DETERMINING THE DEPTH OF LIQUID COLUMNS AND THE LIKE
Otto Oehling, Ludwigshafen (Rhine), Germany, assignor to Mellabora G.m.b.H., Ludwigshafen (Rhine), Germany
Filed May 5, 1959, Ser. No. 811,165
1 Claim. (Cl. 88—2.4)

The present invention relates to range finders in general, and more particularly to an optical instrument utilizing a pair of optical members, such as mirrors or prisms, for determining the depth of liquid columns in containers of known height.

Range finders operating with two mirrors are widely utilized in many types of cameras and in certain other optical instruments. A serious drawback common to known range finders is the diminishing accuracy of readings with increases in distance from the object or target, i.e. the readings are reliable only when the distance from the object does not exceed a certain rather limited range. This will be more readily understood upon reading of the following short description of presently utilized range finders.

One of the mirrors directs the light rays reflected by the object onto the rear side of the other mirror which latter again reflects the rays to the point of observation where an image is produced by the reflected light rays. A second image is formed by rays which are reflected on the object and pass directly toward the point of observation. Thus, before the range finder is adjusted, an observer will discern two distinct images which differ only in light intensity from each other. The means for adjusting the first mentioned mirror in such manner that the two images are caused to overlap is normally combined with a graduated scale which furnishes readings as to the actual distance from the object. It is customary to utilize a cylindrical scale which is rotatable about, but is not movable in the direction of, its axis. The readings on the scale are based on known trigonometric calculations which need not be explained in this description. Since the bases of the mirrors remain unchanged and only their angular relationship is subject to variations during adjustment, a different distance from the object corresponds to each relative angular position of the mirrors, and the aforementioned scale is calibrated accordingly. However, the ratio between various angular positions of the mirrors, on the one hand, and the various distances from the object, on the other hand, is not a linear one but is a tangential function of the angle enclosed by the mirrors. Since the tangent of an angle varies from zero to infinity when the angle is changed between zero and ninety degrees, the changes in distance from the object which correspond to angular changes between the mirrors from zero to 45° (tangent equals one) are rather small but increase considerably as the angle is varied only slightly beyond 45°. Thus, when the distance from an object exceeds, say, three feet, very small changes in the angular position of one mirror with respect to the other mirror correspond to considerable changes in the distance from an object and, consequently, the readings on the scales of so constructed range finders become progressively less accurate and the graduations more crowded as the distance from the object increases.

It is, therfeore, an important object of the present invention to provide a range finder which is so constructed that the relative movements of its mirrors are controlled in a way to maintain substantial or approximate linearity between the changes in the position of the scale and the changes in the distance from an object.

Another object of the invention is to provide a device for determining the height of a liquid column which is equipped with its own source of light to facilitate measurements of the distance from and subsequent calculation of the depth of liquid columns whose surface is not accessible to daylight.

A further object of the invention is to provide an instrument of the above outlined character which is combined with a scale or dial on which the readings or graduations corresponding to progressively changing distances from the objects are substantially or at least nearly uniformly spaced from each other.

A still further object of the invention is to provide an improved range finder utilizing a pair of mirrors or prisms which is capable of furnishing accurate readings within a very wide operating range.

Still another object of the invention is to provide a range finder which is particularly suitable for determining the height of liquid columns in containers of known depth, which is of very compact design, which is easy to manipulate, which consists of a comparatively small number of component parts, and which forms a self-contained unit capable of being stored in a small case or the like.

The above and other objects of the invention are attained by the provision of a range finder having a casing formed with a pair of apertures one of which is aligned with the object, e.g. the reflecting surface of a liquid column, with an observation opening for the observer's eye, as well as with a part-reflecting and part-transmitting first optical member, such as a mirror or prism mounted in the casing at a given angle intermediate the one aperture and the observation opening. The other aperture is aligned with a pivotal second optical member, such as a mirror or prism, which is capable of reflecting light rays entering from the object through the last mentioned aperture onto the first optical member, and the latter reflects such light rays into the observation opening and thus into an observer's eye to form a second image in addition to that formed by light rays passing from the object directly into the observation opening. The casing may also house a source of light, preferably comprising a light bulb, a primary or secondary cell, e.g. a rod battery, as well as switch means for closing the circuit of the light bulb when the object is not accessible to daylight. Further installed in the casing is an arm or lever to which the reflecting second optical member is connected, and an angularly and axially displaceable dial or scale which is so mounted that, when displaced, it also pivots the arm and the reflecting optical member thereon in such manner that angular movements of the arm in response to substantially uniform axial displacements of the scale decrease as the distance from the object increases.

Other features of the novel range finder include the provision of an ocular inserted into the observation opening in which the two images are formed, of means for facilitating the reading of graduations on the scale and thus the exact distance from the object, of means for axially guiding the scale when the latter is angularly displaced in the casing, and of specific switch means for closing the circuit of the light source for shorter or longer periods of time.

The invention will now be described in greater detail with reference to the accompanying drawing in which:

FIG. 1 is an elevational view of a range finder embodying my invention;

FIG. 2 is a central section taken on line II—II of FIG. 1, as seen in the direction of arrows.

Figure 3:
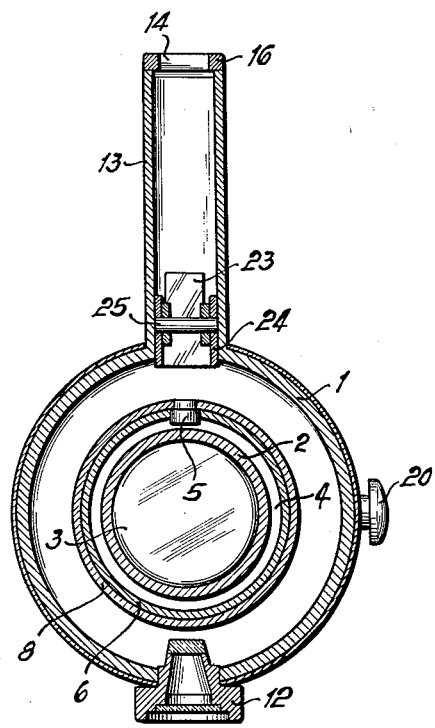
FIG. 3 is a transverse section taken on line III—III of FIG. 2, as seen in the direction of arrows.

Referring now in greater detail to the drawing, there is shown a range finder particularly suited for determining the depth of liquid columns which comprises a preferably cylindrical casing or housing 1 receiving a shell 2 for the rod-like battery or cell 3. The inner end of shell or sleeve 2 is non-rotatably fixed to a partition 1a in casing 1, and its surface is formed with external threads 4 which guide a pin or follower 5, the latter being fixed to the inner side of a cylindrical dial or scale 8. The graduations on the surface of dial 8 are helically arranged. A second sleeve or cylinder 6 is interposed between parts 2 and 8, and is formed with an axially parallel slot or cutout 7 through which the follower 5 extends into the helical groove formed by threads 4. The outer end of cylinder 6 is connected to or integrally formed with a knurled knob or handgrip member 9 whose coaxial bore is closed by a discoid cover or cap 10.

As is shown in FIG. 2, the end of handgrip member 9 is internally threaded to mesh with the threads on the peripheral zone of cap 10. As an alternative, cap 10 may be inserted into and retained in handgrip member 9 in bayonet lock fashion.

Cap or cover 10 is traversed by the stem or extension of a comparatively small knob 11 which is screwed into the end wall of a cupped member 2a. This member is slid over and removably held on the outer end of sleeve 2, and contains a coiled spring 2b which urges the battery or cell 3 into contact with one terminal of a resilient conductor 3a. Thus, knob 11 and cupped member 2a prevent axial displacements of cylinder 6 with respect to sleeve 2 while the scale 8 is free to perform axial movements with respect to member 6. Angular movements of dial 8 with respect to the cylinder 6 are prevented by slot 7 which permits passage of follower 5 into the groove between threads 4 on stationary sleeve 2. When the cylinder 6 is rotated by its handgrip member 9, it causes rotation and simultaneous axial displacements of dial 8. The battery 3 may be exchanged upon removal of knob 11, cap 10 and cupped member 2a in that order.

Casing 1 has a window 12 to facilitate reading of helically arranged graduations which are externally applied to the peripheral zone of cylindrical dial 8. The casing 1 further supports or is integrally formed with an extension or receptacle 13 of preferably rectangular cross-sectional contour which comprises an end plate 14 distant from parts 2, 6 and 8 and formed with a pair of windows or apertures 15, 16, as well as with a light-transmitting passage or slit 17. The latter is preferably close to the aperture 15. Adjacent the slit 17 and located in the receptacle or extension 13, there is provided a chamber 18 receiving a source of light 19 which latter may be electrically connected with the adjacent second terminal of conductor 3a to be supplied with current by the battery or cell 3. An external push-button operated switch 20 is installed in the casing 1 to move the conductor 3a into contact with the light source 19, e.g. a light bulb, and thus to close the circuit when the range finder is put to actual use.

Opposite the window or aperture 15, and preferably axially parallel with window 12, there is formed in casing 1 an observation opening receiving an ocular 21 which enables the observer to view an object or target directly through a part-reflecting and part-transmitting optical member or mirror 22 mounted in casing 1 in the line of sight between the ocular 21 and aperture 15. The aforementioned opening, and more particularly the ocular 21 therein, constitutes the point of observation when the range finder is put to use. Aligned with the second aperture 16 in the end wall 14 of receptacle 13, there is mounted in casing 1 a reflecting second optical member or mirror 23 connected to a swingable arm or lever 24 and preferably closely adjacent to the pivot pin or axle 25 which connects the member 24 to the casing. Pin 25 is mounted at right angles to the axis of dial 8. Lever 24 is constantly biased (spring not shown) into abutment with the annular flange or ring 26 at the inner end of cylindrical dial 8. In order to facilitate initial adjustments in the position of swingable member 24 and hence of reflecting mirror 23, a stop screw 27 is inserted into a tapped bore formed in the lateral end wall of receptacle 13 and is movable toward and away from lever 24 to limit the latter's angular movements in a circular path about its pivot axle 25. It will be readily understood that the mirrors 22, 23 may be replaced by suitable prismatic bodies, if desired. Also, a set of lenses may be attached to ocular 21 if it is desired to increase the operating range of the instrument.

The range finder operates as follows:

It is assumed that the distance of liquid surface from the top of a tank or the like requires determination and it is further assumed that the height of the liquid tank is known. In other words, by knowing the height of the tank and by determining the distance between the liquid surface and the top of the tank, the user can calculate the depth of liquid column by a simple subtraction. The instrument is held above the tank in such manner that the apertures 15, 16 are turned toward the liquid surface. The observer places his eye to the outer end of ocular 21 and operates the push-button of switch 20 to close the circuit of lamp 19 which latter then sends a ray or beam of light 28 through the passage 17 in a direction toward the object, i.e. toward the liquid surface in the tank. The incident light beam 28 is reflected on the liquid surface and returns as beam 28' to impinge upon the reflecting surface of mirror 23 and to be further deflected, as beam 28", onto the rear surface of mirror 22. Due to the aforementioned characteristics of mirror or optical member 22, namely, that it partly reflects and partly transmits light rays, the observer having his eye at the outer end of ocular 21 will detect two images, one formed by beam 28" which is reflected as beam 28''' on mirror 22 toward the inner side of ocular 21, and the other formed by light ray 28a which is in the line of sight, i.e. passing directly from the object or target being ranged (liquid surface) through aperture 15 and through mirror 22 toward the observation opening in which the ocular 21 is received. Thus, the observer will discern two light spots which are adjacent each other and which are of different light intensities.

By rotating the knob 9, the user also rotates the cylinder 6, thus causing the follower 5 to be entrained along threads 4 longitudinally of the slot 7 to axially displace the dial 8. Ring or flange 26 of the dial bears upon the lever 24 and causes the latter to pivot about pin 25 whereby the angular position of optical member 23 is changed, i.e. depending upon the direction in which the knob 9 is rotated, the optical member 23 may be swung toward or away from a substantially 45° inclination.

By suitable angular displacements of knob 9, the position of mirror 23 can be adjusted in such manner that the images in ocular 21 merge or overlap into a single one, i.e. the image-forming light beam 28''' and the light ray 28a will merge at least in the ocular 21. The user then reads the corresponding distance from the object, i.e. from the liquid surface, on the calibrated helical graduations applied to the peripheral zone of dial 8 by looking through the window 12.

The switch or contactor 20 may be formed with a push-button which is constantly biased by a spring to automatically open the circuit of battery 3 and light bulb 19 when the push-button is released by a user's fingers, it being assumed that the push-button be then in a given angular position, but the switch will continuously light the lamp 19 when the push-button is turned through a selected angle into a different angular position in which the biasing means cannot return it into circuit-opening or inoperative position.

As already mentioned hereinabove, an important object of the invention is to change the ratio between the variations in the angle of mirror 23, on the one hand, and the variation in distance from the object, on the other hand, in such manner that substantially equal axial displacements of the dial 8 will correspond to approximately equal changes in the distance from the object. This is attained by so mounting the lever 24 that the consecutive axial displacements of dial 8 which are of equal magnitude bring about progressively decreasing angular displacements of mirror 23. That the connection between parts 8, 26 and 23, 24, is such will be readily understood by referring to FIG. 2 since the ring 26 advances in a linear path and not in a circle about the pivot pin 25, i.e. the movements of ring 26 are approximately proportional to the tangents of the angle defined in the corresponding angular movement of the lever 24 about the pivot member 25. When the ring 26 is closer to pin 25, any displacements thereof in the axial direction of sleeve 2 will bring about comparatively large angular displacements of mirror 23. However, as the ring 26 moves away from the pin 25, the angular movements of lever 24 decrease for equal linear displacement of the ring 26. This arrangement renders it possible to spread the graduations uniformly over the peripheral zone of cylindrical dial 8 in contrast to known rotary dials whereon the readings corresponding to progressively increasing distances from the object are densely grouped while the readings corresponding to comparatively small distances from a target are widely spaced from each other.

Another important advantage of axially and angularly displaceable dial 8 which surrounds the cylindrical or rod-shaped battery 3 is in that it occupies very little space, thus allowing for a compact design of the optical instrument, and in that it is capable of furnishing very accurate readings. A viewer looking though the window 12 has the impression of seeing a curved scale of great length when the cylindrical dial 8 is advanced therealong by the threads 4 which engage the follower 5. Such arrangement of graduations may be attained only by providing a dial of cylindrical shape which is angularly and axially displaced when the mirror 23 is pivoted to bring the images in ocular 21 into overlapping position.

The invention is, of course, not limited to the exact details of construction shown in the drawing but may be embodied in many modifications such as are within the spirit and scope of the appended claim.

What is claimed is:

A device for measuring a distance from a reflective surface, comprising a source of a beam of light adapted to be directed toward said surface; and optical range finder means in fixed spatial relationship to said source for determing the distance of said range finder means from said source along said beam when the latter is reflected by said surface toward said range finder means, said range finder means including a casing having a pair of apertures and an observation opening aligned with one of said apertures, said source being mounted on said casing; a part-reflecting and part-transmitting optical member installed in the casing between said one aperture and said opening and adapted to transmit said reflected light beam through said one aperture whereby a first image may be observed in said opening; a reflecting second optical member in said casing in the line of sight from said surface through the other aperture and adapted to deflect onto said first optical member light rays reflected by the surface through said other aperture, said first optical member deflecting such light into said opening to be observed as a second image; a lever pivotally installed on said casing and connected with said second optical member for changing the latter's position whereby to overlap said images; means in said casing for pivoting the lever comprising cylindrical dial means; a motion transmitting member connected to said dial means for joint motion therewith and engaging said lever; and means for axially and angularly displacing said dial means to pivot the lever into and away from a position in which said images overlap, said lever having a camming face radially extending from the axis of pivoting movement of said lever, said motion transmitting member being in camming engagement with said face at a point of contact, and said point of contact moving along a path in a plane transverse of said axis of pivoting and radially offset from said axis when said dial means is displaced to pivot said lever.

References Cited in the file of this patent

UNITED STATES PATENTS

| | | |
|---|---|---|
| 2,023,313 | DiCarlo et al. | Dec. 3, 1935 |
| 2,178,857 | Hineline | Nov. 7, 1939 |
| 2,312,261 | Mills | Feb. 23, 1943 |
| 2,403,308 | Schwartz et al. | July 2, 1946 |

FOREIGN PATENTS

| | | |
|---|---|---|
| 551,510 | Great Britain | Feb. 25, 1943 |